(12) United States Patent
Deutsch et al.

(10) Patent No.: US 8,626,134 B2
(45) Date of Patent: Jan. 7, 2014

(54) METHOD AND SYSTEM FOR PASSING INFORMATION THROUGH A NETWORK DURING OVERLOAD

(75) Inventors: Douglas A. Deutsch, Naperville, IL (US); Keith R. Stanley, Warrenville, IL (US)

(73) Assignee: 8631654 Canada Inc., Ottawa, Ontario ( * ) Notice: Subject to any disclaimer, the term of this patent is extended or adjusted under 35 U.S.C. 154(b) by 333 days.

(21) Appl. No.: 12/570,815

(22) Filed: Sep. 30, 2009

(65) Prior Publication Data

US 2011/0077000 A1    Mar. 31, 2011

(51) Int. Cl.
| | |
|---|---|
| *H04W 4/00* | (2009.01) |
| *H04M 11/04* | (2006.01) |
| *H04M 3/42* | (2006.01) |
| *H04W 74/00* | (2009.01) |
| *H04W 72/00* | (2009.01) |
| *H04B 7/00* | (2006.01) |
| *H04M 1/64* | (2006.01) |

(52) U.S. Cl.
USPC ............... 455/414.1; 455/404.1; 455/450; 455/466; 455/509; 379/88.22

(58) Field of Classification Search
USPC ............. 379/41, 88.22, 209.01; 455/8, 404.1, 455/445, 450, 509, 560, 414.1, 466
See application file for complete search history.

(56) References Cited

U.S. PATENT DOCUMENTS

| 6,826,397 | B1 | 11/2004 | Vasa | |
|---|---|---|---|---|
| 7,792,265 | B2 * | 9/2010 | Hughes et al. | ........... 379/210.01 |
| 2005/0047561 | A1 | 3/2005 | Seiferth | |
| 2008/0075249 | A1 * | 3/2008 | Zach et al. | ............... 379/114.17 |
| 2013/0045723 | A1 * | 2/2013 | Sony et al. | ................. 455/414.1 |

FOREIGN PATENT DOCUMENTS

WO    WO 97/50224 A1    12/1997

OTHER PUBLICATIONS

Crowe, Daniel, "Cellular Networking Perspectives," Nov. 2006.*

\* cited by examiner

*Primary Examiner* — Ariel Balaoing
*Assistant Examiner* — Larry Sternbane
(74) *Attorney, Agent, or Firm* — Volpe and Koenig, P.C.

(57) ABSTRACT

A method is provided for passing information through a network during overload and subsequent actions to reduce congestion. An exemplary method includes receiving an origination request from a mobile device of a calling party, detecting an overload condition, transmitting a message request to a terminating network element associated with a called party in response to the origination request during the overload condition, receiving an acknowledgement of receipt of the message request, and denying the origination request. In this manner, high resource requests (e.g. a voice call) may be converted into lower resource requests (e.g. text or voicemail messages), or the resource request may be deferred to a more appropriate time.

20 Claims, 3 Drawing Sheets

METHOD AND SYSTEM FOR PASSING INFORMATION THROUGH A NETWORK DURING OVERLOAD

FIELD OF THE INVENTION

This invention relates to a method and system for passing information through a network during overload and selectively implementing subsequent actions to reduce congestion.

BACKGROUND

Current overload controls terminate subscriber voice requests during an overload condition. For example, in most overload situations encountered by, for example, a mobile switching center (MSC), alarms and denials of origination are offered—not completed calls. This is not desirable when the overload is caused by some exceptional event, such as an emergency, a disaster, a large gathering . . . etc. During exceptional events, subscribers have a strong inclination to attempt to communicate with others such as loved ones. For example, subscribers may wish to send a message indicating their well-being during an emergency situation. Under the current approach, termination of the calls during overload provides incentive for the callers to continue to repeatedly dial—and thus prolong the overload—making it more difficult to send the message. In addition, under the current approach, the termination of calls results in less revenue for the service providers than would be enjoyed if the calls were completed. In the case of Mobile networks, the Air interface is a costly resource, and that resource has already been allocated and consumed. Once the resource has been allocated, it is best to generate revenue from its use.

SUMMARY

A method and system for passing information through a network during overload are provided. Embodiments of the method and system convert high resource requests (e.g. a voice call) into lower resource requests (e.g. text or voicemail messages), or defer the resource request to a more appropriate time.

While embodiments of the invention may be particularly beneficial for addressing overload conditions in the network, and will be thus described with specific reference thereto, it will be appreciated that the embodiments of the invention may have usefulness in other applications. For example, embodiments of the invention may be used in a variety of circumstances where it is desirable to pass information through a network without establishing a complete end-to-end call connection, such a providing graded levels of service based on subscriber profile or calling location. Thus, herein, an 'overload condition' will refer to a circumstance during which it is desirable to pass information through a network without establishing a complete end-to-end call connection.

In one embodiment, the method comprises receiving an origination request from a mobile device of a calling party, detecting an overload condition, in response to the origination request during the overload condition transmitting a message request to a terminating network element associated with a called party, receiving an acknowledgement of receipt of the message request, and, denying the origination request.

In another embodiment, the method further comprises transmitting a message (e.g. for display or audible playback) to the called party by the terminating network element based on the message request.

In another embodiment, the message request includes at least one of an identification of the calling party, a location of the calling party, a timestamp and text.

In another embodiment, the terminating network element transmits the acknowledgement.

In another embodiment, receiving the origination request, detecting, transmitting, receiving the acknowledgement and denying are accomplished by an originating network element.

In another embodiment, the originating network element is a mobile switching center or a media gateway.

In another embodiment, the denying of the origination request further comprises transmitting a message (e.g. for display or playback on the calling party's network access device) to the calling party.

In another embodiment, the message comprises options for subsequently establishing a call to the called party.

In another embodiment, the method further comprises disconnecting by the mobile device based on the message.

In another embodiment, a communications system comprises an originating network element configured to receive an origination request from a mobile device of a calling party, detect overload condition, transmit a message request to a terminating network element associated with a called party, receive an acknowledgement of receipt of the message request, and deny the origination request. The system may also include a terminating network element configured to transmit a message to the called party based on the message request.

In another embodiment, the message request includes at least one of an identification of the calling party, a location of the calling party, a timestamp and text.

In another embodiment, the terminating network element transmits the acknowledgement.

In another embodiment, the originating network element is a mobile switching center or a media gateway.

In another embodiment, the originating network element is configured to send a second message to the calling party when the origination request is denied.

In another embodiment, the second message comprises options for subsequently establishing a call to the called party.

In another embodiment, the mobile device is configured to disconnect based on the second message.

In another embodiment, the system comprises means for receiving an origination request from a mobile device of a calling party, means for detecting an overload condition, means for transmitting, in response to the overload condition, a message request to the terminating network element associated with the called party, means for receiving an acknowledgement of receipt of the message request, and, means denying the origination request.

In another embodiment, the system comprises a means for transmitting a message to the called party based on the message request.

In another embodiment, the means for denying the origination request further comprises means for transmitting a second message to the calling party.

In another embodiment, the mobile device is operative to disconnect based on the second message.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
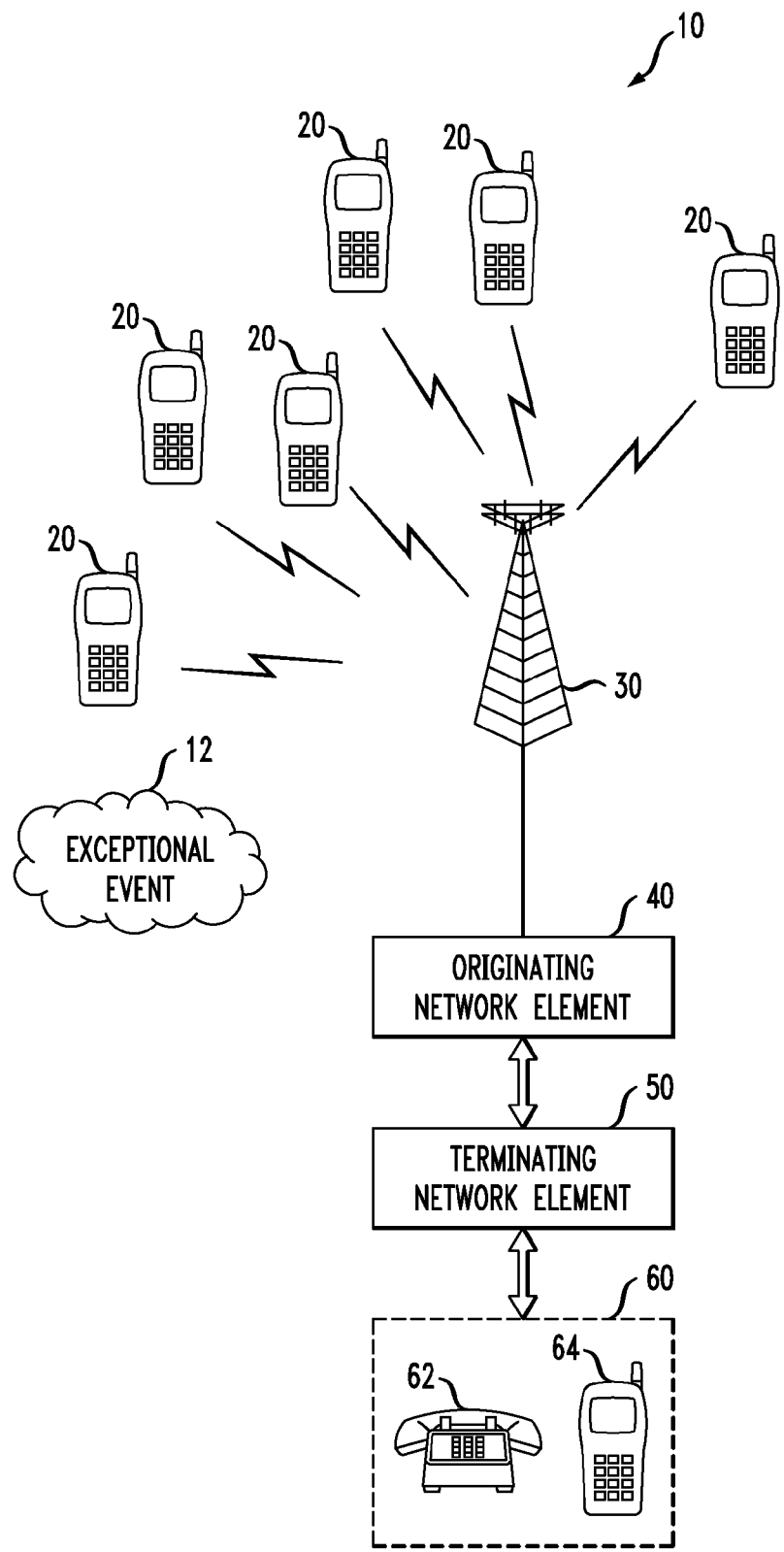
FIG. 1 is a block diagram of a system into which the presently described embodiments may be incorporated.

Referring now to the drawings wherein the showings are for purposes of illustrating the exemplary embodiments only and not for purposes of limiting the claimed subject matter, FIG. 1 provides a view of an example system into which the presently described embodiments may be incorporated. As shown generally, FIG. 1 shows a system 10 serving an area where an exceptional event 12 takes place. It should be appreciated the exceptional event may take a variety of forms including a disaster, emergency, large gathering of people . . . etc. As noted above, such an exceptional event can cause a spike in activity on a mobile network and cause an overload. The presently described embodiments applied to the system 10 address this overload by reducing congestion and increasing throughput of the system. It should be further appreciated that the service associated with the presently described embodiments can be subscription-based or may be triggered for all callers upon experiencing an exceptional event.

More particularly, the system 10 is capable of receiving origination requests and other signals from mobile devices, such as those mobile devices identified by reference numeral 20. As shown, the mobile devices 20 connect to a base station or cell site 30 which is in communication with an originating network element 40. The mobile devices 20 and base station or cell site 30 may take a variety of forms as a function of user preference and/or network design. Likewise, the originating network element 40 may take a variety of forms including that of a mobile switching center (MSC) or a media gateway. Although not shown for ease of reference, the element 40 may include or be in operative communication with a variety of other network elements such as MMRs, HLRs, etc.

Also shown is a terminating network element 50 within a terminating network that communicates with the originating network element 40 by way of a signaling network, such as an SS7 signaling network or the like. Similar to the originating network element 40, the terminating element network 50 may take a variety of forms including a mobile switching center, a media gateway or a landline switching element.

The system described is able to communicate through the terminating network element 50 with a called party, or terminating point, 60. It should be appreciated the called party 60 may use a variety of devices including a landline phone 62 or a mobile device 64. In the case of a landline phone, suitable mechanisms and/or switching modules may be implemented in customer premise equipment (CPE) so that network messages may be relayed to the user.

The originating network element 40, in at least one form, is configured and thus operative to receive an originating request from a mobile device (such as mobile device 20) of a calling party, detect an overload condition in the network as caused by, for example, the exceptional event 12, transmit a message to a terminating network 50 associated with the called party, receive an acknowledgement of receipt of the message and deny the origination request of the mobile device 20. It should be appreciated that the denial of the origination request may also include information for the calling party as to options that are available to the calling party to subsequently reach the called party.

In at least one form, the terminating network element 50 is configured to transmit a message to the called party based on the message request received from the originating network element 40. Details of such a message, in at least one form, will be described in connection with FIG. 2; however, the message will include at least the calling line identification (CLID) information so that the called party is able to identify the calling party.

Figure 2:
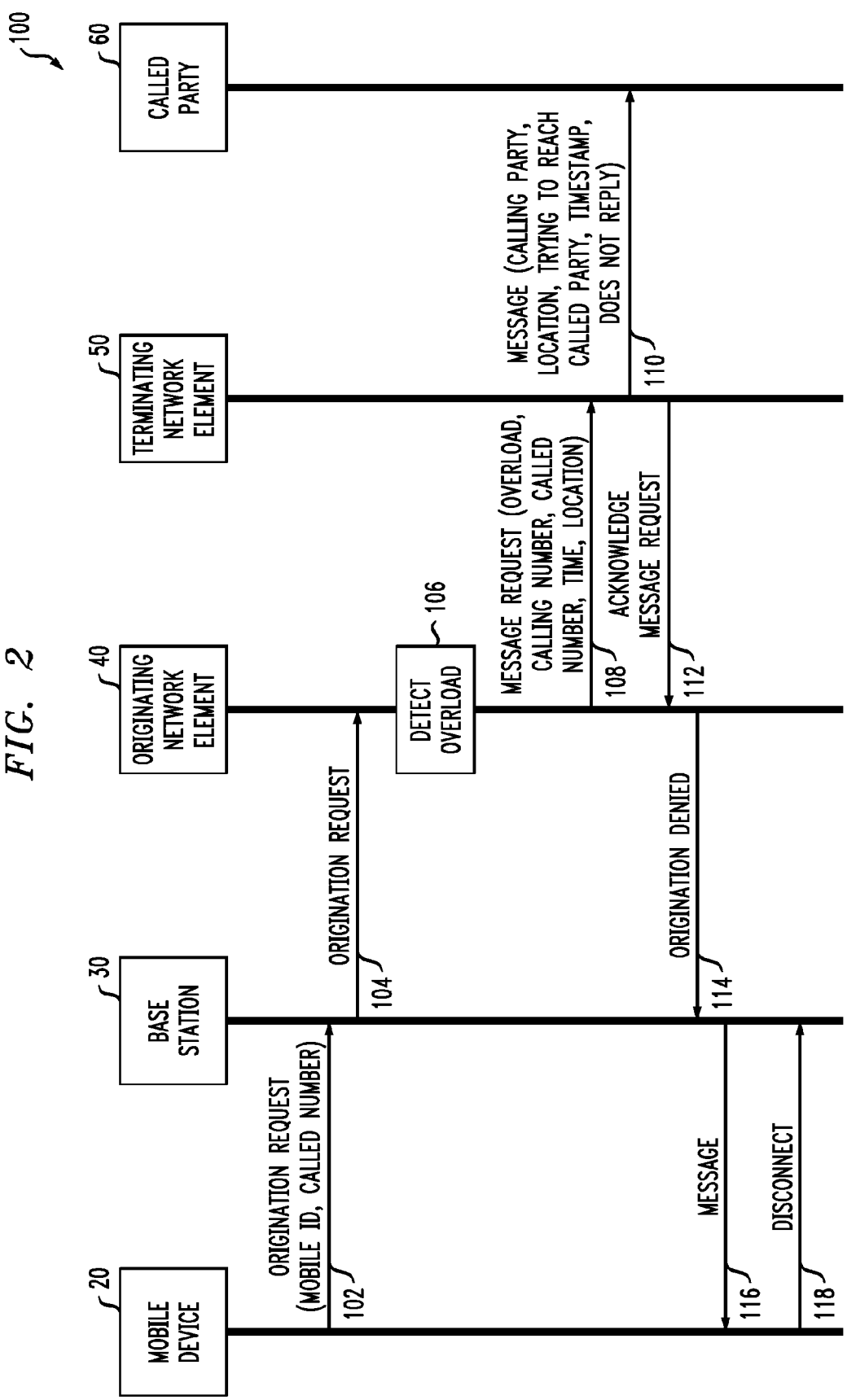
FIG. 2 is an example call flow diagram according to the presently described embodiments.

With reference now to FIG. 2, an example call flow diagram 100 is illustrated. In the call flow diagram 100, an origination request is transmitted from an originating mobile device 20 to a base station 30, and then on to the originating network element 40 (at 102 and 104). It should be appreciated that the origination request may take a variety of forms but, in at least one form, will include mobile identification numbers and called party numbers. The originating network element 40 will perform overload detection (at 106) in any of a variety of ways that are well known in the art. The overload condition may be at the radio level, the MSC level or some other resource cluster in alternative network architectures. In one form, an MMC/HLR determines an overload condition, and may also determine the type of network the calling party is trying to reach, such as a landline (PSTN). Upon detection of an overload and in response to the origination request, the originating network element 40 sends a message request (at 108) to the terminating network element 50. In one form, this is accomplished when an MSC forwards a request to the PSTN to deliver CLID to called party—essentially allowing the non-congested terminating network to set up a "half call."

Although the message request may take a variety of forms, in at least one form, the message request may include an indication of overload, a calling number, a called number, time and a location of the originating mobile device 20.

Based on the message request sent by the originating network element 40, the terminating network element 50 will send a message to the called party 60 (at 110). The message may take a variety of forms, but in at least one form, the message includes identification of the calling party, the calling party's location, a timestamp and various text portions. These text portions may include a variety of different types of information but, in at least one form, the text portion may include a statement of the status of the calling party and a warning to not reply to the message. The message may also include a recorded portion to be played back to the called party. In this way, in the case of a landline subscriber at the terminating point, the PSTN delivers the call, but completes the call by connecting the called party to a recorded announcement on the PSTN switch. This indicates to the called party that the calling party is safe, for example. This can also be used to send specific messages for common occasions to be sent at times of significant network traffic peaks—such as greetings and well wishes for a New Year.

The terminating network element 50 also sends an acknowledgement message back to the originating network element 40 indicating that the message request was received (at 112). The acknowledgement message may take a variety of forms, but in at least one form, includes identification of the calling party and the called party.

The originating network element 40 also transmits an origination denial (at 114) to the base station 30. This origination denial may also include a verification that the first message was sent to the terminating network and/or instructions to deliver a message to the calling party regarding any of a variety of matters. For example, the intended message may include options for establishing a call to the called party at an appropriate time. Accordingly, a message is sent back to the originating mobile device 20 (at 116). It should be appreciated that one of the objectives of the present application is to decrease congestion on the network. Therefore, in one embodiment, instructions are provided from the originating network element 40 in the message (at 116) that direct the mobile device to disconnect from the network (at 118).

Figure 3:
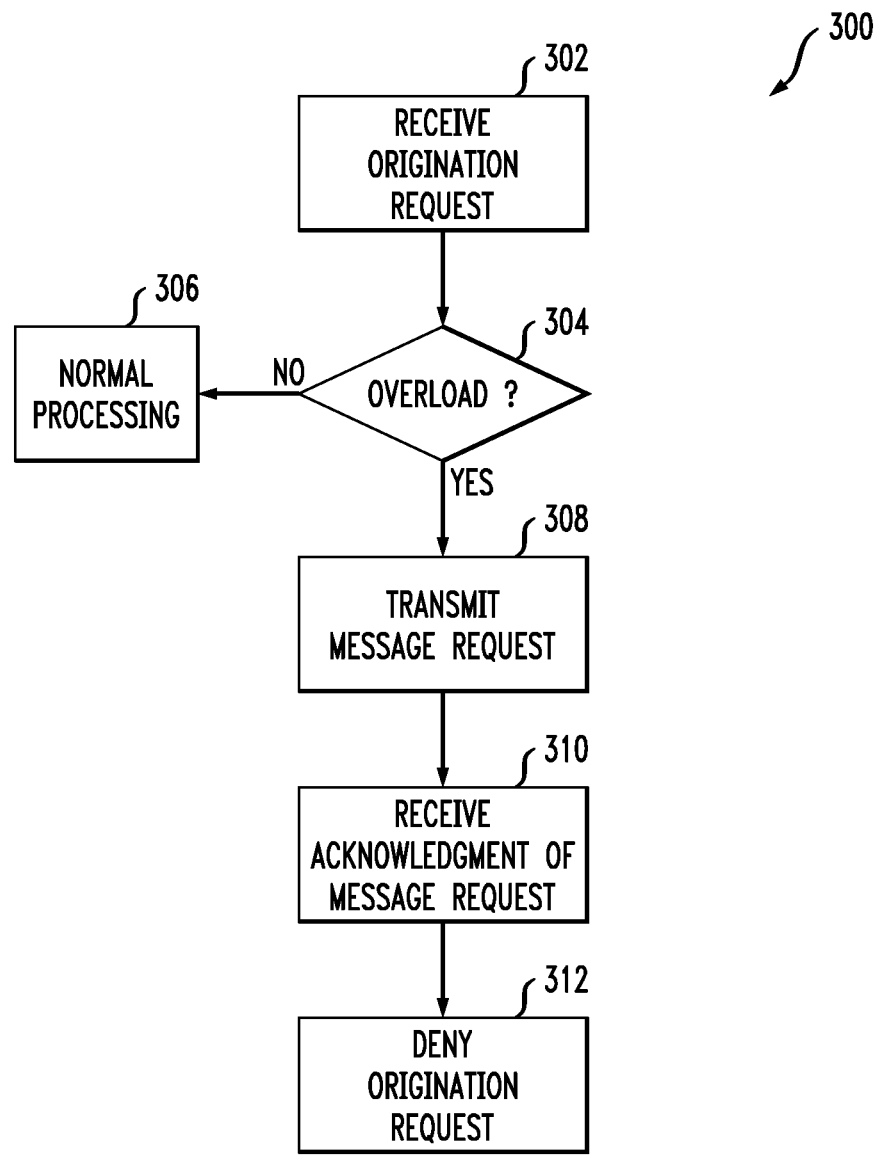
FIG. 3 is a flow chart illustrating a method according to the presently described embodiments.

With reference now to FIG. 3, a exemplary method 300 according to the presently described embodiments is illustrated. It should be appreciated that the method 300, as well as other methods according to the presently described embodiments, may be implemented in a variety of manners and take a variety of forms. Along these lines, various hardware configurations and/or software techniques may be used to implement the presently described embodiments. For example, various software routines may be run within the hardware of the system, such as the originating network element and/or the terminating network element. Those with skill in the art will appreciate that, in at least one form, the originating network elements can serve to detect overload and function to accomplish many of the functions described herein while the terminating network element may be modified to recognize the intended functionality of the presently described embodiments and implement such functionality.

More generally, a person of skill in the art would readily recognize that steps of various described methods can be performed by network elements having programmed computers. In this regard, some embodiments are also intended to cover program storage devices associated with the network elements such as digital data storage media, which are machine or computer readable and include machine executable or computer executable programs of instructions, wherein said instructions perform some or all of the steps of the described methods. The program storage devices may be, e.g., digital memories, magnetic storage media such as magnetic disks and of magnetic tapes, hard drives or optically readable digital storage media. The embodiments are also intended to cover a computer's program to perform functions of the above methods.

With reference back to FIG. 3, the exemplary method 300 includes a step of receiving an origination request from, for example, an originating network element 40 (at 302). The originating network element 40 will then determine if an overload condition exists (at 304). If there is no overload, normal processing occurs (at 306).

If, however, an overload condition does exist, the originating network element 40 will transmit a message request to a terminating network element 50 (at 308). The originating network element 40 also receives an acknowledgement of the message from the terminating network element 50 (at 310) and, denies the origination request of the originating mobile device 20 (at 312).

It should be appreciated that, in at least one form, the method described in connection with FIG. 3 is performed by the originating network element 40. However, it should be appreciated that other functions according to the presently described embodiments may be performed by other elements of the system described in FIG. 1. For example, the terminating network element is operative to send a message to the called party that informs the called party that the calling party is trying to reach the called party. Likewise, the base station 30 is operative to send a message back to the calling party indicating that the call connection was denied and providing options for subsequent connection to the called party.

Implementation of the presently described embodiments will enable service providers to offer grades of service during catastrophic events or exceptional events (in at least some cases for a fee). This increases network generated revenue from premium subscribers and reduces overload duration by converting some voice calls that would not complete into CLID Delivery or, in some cases, text or voice messages for which fees may be charged. Thus, the load on the system is reduced quicker and requests are handled using fewer network resources. Also, service providers can provide premium service including the features described herein—billing subscribers either monthly or only for actual use. The consumption of Air interface resource yields an exchange of information between caller and called party, rather than a failed attempt, thus monetizing the value of the consumed resource.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method comprising:
   receiving an origination request from a mobile device of a calling party;
   detecting an overload condition;
   in response to the origination request during the overload condition, transmitting a message request to a terminating network element associated with a called party;
   receiving an acknowledgement of receipt of the message request; and,
   in response to the receipt of the acknowledgement, denying the origination request and providing verification that the message request was sent to the terminating network element.

2. The method as set forth in claim 1 further comprising transmitting a message to the called party by the terminating network element based on the message request.

3. The method as set forth in claim 2 wherein the message request includes at least one of an identification of the calling party, a location of the calling party, a timestamp and text.

4. The method as set forth in claim 1 wherein the terminating network element transmits the acknowledgement.

5. The method as set forth in claim 1 wherein receiving the origination request, detecting, transmitting, receiving the acknowledgement and denying are accomplished by an originating network element.

6. The method as set forth in claim 5 wherein the originating network element is a mobile switching center or a media gateway.

7. The method as set forth in claim 1 wherein the denying of the origination request further comprises transmitting a message to the calling party.

8. The method as set forth in claim 7 wherein the message comprises options for subsequently establishing a call to the called party.

9. The method as set forth in claim 7 further comprising disconnecting by the mobile device based on the message.

10. A system comprising:
    an originating network element configured to receive an origination request from a mobile device of a calling party, detect an overload condition, transmit a message request to a terminating network element associated with a called party in response to the origination request during an occurrence of the overload condition, receive an acknowledgement of receipt of the message request, and in response to the receipt of the acknowledgement, denying the origination request and providing verification that the message request was sent to the terminating network element.

11. The system as set forth in claim 10 wherein the message request includes at least one of an identification of the calling party, a location of the calling party, a timestamp and text.

12. The system as set forth in claim 10 further comprising:
a terminating network element operative to transmit a message to the called party based on the message request, wherein the terminating network element transmits the acknowledgement.

13. The system as set forth in claim 10 wherein the originating network element is a mobile switching center or a media gateway.

14. The system as set forth in claim 10 wherein the originating network element is configured to send a second message to the calling party when the origination request is denied.

15. The system as set forth in claim 14 wherein the second message comprises options for subsequently establishing a call to the called party.

16. The system as set forth in claim 14 wherein the mobile device is operative to disconnect based on the second message.

17. A system for passing information for a calling party through a network in an overload condition to a called party, the system comprising:
means for receiving an origination request from a mobile device of the calling party;
means for detecting an overload condition;
means for transmitting a message request to a terminating network element associated with the called party;
means for receiving an acknowledgement of receipt of the message request; and,
means for, in response to the receipt of the acknowledgement, denying the origination request and providing verification that the message request was sent to the terminating network element.

18. The system as set forth in claim 17 further comprising a means for transmitting a message to the called party based on the message request.

19. The system as set forth in claim 17 wherein the means for denying the origination request further comprises means for transmitting a second message to the calling party.

20. The system as set forth in claim 19 wherein the mobile device is operative to disconnect based on the second message.

* * * * *

UNITED STATES PATENT AND TRADEMARK OFFICE
CERTIFICATE OF CORRECTION

| | | |
|---|---|---|
| PATENT NO. | : 8,626,134 B2 | Page 1 of 1 |
| APPLICATION NO. | : 12/570815 | |
| DATED | : January 7, 2014 | |
| INVENTOR(S) | : Deutsch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this
Eleventh Day of August, 2015

Michelle K. Lee
*Director of the United States Patent and Trademark Office*